United States Patent [19]

Mooney et al.

[11] Patent Number: 5,713,595
[45] Date of Patent: Feb. 3, 1998

[54] INFLATOR FOR VEHICULAR AIR BAGS

[75] Inventors: Thomas Mooney, Palos Verdes; Gaybert B. Little, Redondo Beach, both of Calif.; Guy Little, Mosas Lake, Wash.

[73] Assignee: Hi-Shear Technology Corporation, Torrance, Calif.

[21] Appl. No.: 332,415

[22] Filed: Oct. 31, 1994

[51] Int. Cl.[6] ................................................ B60R 21/26
[52] U.S. Cl. ...................... 280/736; 102/202.5; 102/531; 280/741; 280/742
[58] Field of Search .......................... 280/736, 740, 280/741, 742; 102/272, 273, 530, 531, 202.5

*Primary Examiner*—Eric D. Culbreth
*Attorney, Agent, or Firm*—Donald D. Mon

[57] ABSTRACT

A gas generator for a vehicular air bag. A capsular enclosure forms a reaction chamber with a wall having a frangible portion. An electrically-conductive, heat-generating initiator inside the chamber initiates a liquid gas-generating charge that is auto-ignitable by the initiator. Its reaction is self-sustaining after ignition. The gas generated bursts the frangible portion and supplies the air bag. The active components of the charge are nitrous oxide and oxygen.

15 Claims, 2 Drawing Sheets

INFLATOR FOR VEHICULAR AIR BAGS

FIELD OF THE INVENTION

An inflator for vehicular air bags which utilizes a liquid gas-generating charge.

BACKGROUND OF THE INVENTION

Bags which are to be inflated in the event of an impact of sufficient severity are well known. They include a gas-generating charge of high pressure compressed gas, or more commonly of a solid pyrotechnic charge which when initiated quickly generates a supply of gas to fill the bag.

The disadvantages of both of these charges are well-known. The gas bottle is carried as a potential risk both during the lifetime of the automobile and when the vehicle is scrapped. If the wrecker has not removed the bottle, and inadvertently cuts it, an explosive situation could occur without his foreknowledge. It is both a physical threat of flying objects, and/or a fire threat, because its contents may catch on fire.

The solid charges involve the risks to the wrecker that he may initiate the charge without knowing it, incurring exposure to a toxic substance or of spilling a dangerous substance. The solid products are generally not environmentally suitable, and can readily be ignited.

Further, there are substantial risks inherent in the manufacture of the solid propellent, such as are commonly used for solid gas-generating charges. These charges, often azides, are tabletted in munitions—grade facilities, and have their share of accidents, many of them fatal. The very property that makes these products suitable for air bag inflation—quick reaction to generate high temperature gases, is also the property which makes them risky to process.

It has only recently become appreciated that a liquid charge can be even more effective for gas generation than a solid charge, and that some of the above risks inherent in the use of a solid charge and compressed gases can be overcome. In fact an inflator according to this invention can eliminate all of them.

However, the earlier efforts to use liquid charges that are known to the inventors herein have required complicated apparatus, and chemical ignition charges that are initiated by still another initiator to set them off. Movable gas control means in them such as pistons are the norm to control the gas-generating reaction and to keep it "burning".

For example, Giovanetti U.S. Pat. No. 5,060,973 utilizes a liquid propellant—a hydroxyl ammonium nitrate-based propellant, which is ignited by a pyrotechnic igniter, for example, smokeless powder set off by an electric primer like an exploding bridge wife. In order to ignite the gas-generating charge in the device, the products of combustion of the pyrotechnic igniter must be discharged into it, and in a controlled manner. This requires a movable piston to separate the main charge from the igniter charge, and separate channel means to convey the ignited gases into a reaction chamber while the piston gradually forces the main charge into the reaction chamber.

This is a relatively complicated arrangement, and friction, degradation or destruction of the piston would be expected to lead to an uncertain output. Furthermore, the propellant compound if it leaked (during scrapping of the vehicle, for example) would contaminate the surroundings. In addition, the black powder charge would still be present as a risk to setting off the main charge.

Brede U.S. Pat. No. 5,30,730 utilizes a liquified gas—a short chain hydrocarbon such as propane, in combination with nitrous oxide (N20). To ignite this change, a pyrotechnic igniter is also used to propel a penetrator piston to puncture the container. The piston carries two sets of channels. One is to carry igniter gas into the storage chamber, and the other is to carry them to a chamber from which the hot gases enter the air bag. In some of his embodiments he keeps his components in separate chambers, and the piston has the additional function of enabling the two components to mix. Then the piston is also required to pierce the two chambers.

The hazards that accompany a stored charge of liquified gas under pressure have been described above, and are found in this construction. Also it requires a movable piston to open the storage chamber or chambers and to regulate and direct the flow of the liquids. Such complications are undesirable in a critical man-safety device.

It is the object of this invention to provide an inflator which requires no moving parts, which even though its charge is under moderate pressure constitutes no storage or scrapping risk, which does not require pyrotechnic means for the charge itself or for its ignition, whose charge composition is environmentally benign, and which can be manufactured, stored and scrapped with no or negligible risk to equipment, facilities, or human life.

BRIEF DESCRIPTION OF THE INVENTION

An inflator according to this invention utilizes as its gas-generating charge a predominantly liquid component which is in the liquid phase when at standard temperature and pressure, and which will remain in the liquid phase when at all temperatures and pressures to be anticipated in the manufacture, use, and scrapping of the inflator.

The charge includes a gaseous component which is significantly soluble in the liquid component when at standard temperature and pressure, and when at all temperatures and pressures to be anticipated in the manufacture, use and scrapping of the inflator.

According to a preferred embodiment of the invention, the liquid component is an alcohol of a saturated open-chain hydrocarbon (alkane series), with carbon between 1 and 4, preferably ethyl alcohol, and the gaseous component is nitrous oxide (N20). Ethyl alcohol has the advantage that it is a "green" substance which is biodegradable and can freely be discharged into the environment without risk.

The mixture of liquid and gas components is stored under suitable pressure in a reaction chamber to increase the amount of N20 in the charge.

The reaction chamber is fitted with a passive ignition device which may be an electrical igniter, or less preferably a chemical ignition means set off by an electrical current, or a laser beam. The wall of the reaction chamber includes frangible portions that are opened by pressure generated by generated gases to form discharge ports.

Preferably, but not necessarily, the hot gases flow through an expansion chamber in which any incompleted combustion occurs and the gases are cooled. They then flow into the air bag. Conveniently, baffles may be provided in the expansion chamber to regulate the flow of the gases, and to some extent to control the rate of reaction in the reaction chamber.

The above and other features of this invention will be fully understood from the following detailed description and the accompanying drawings, in which:

DETAILED DESCRIPTION OF THE INVENTION

Figure 1:
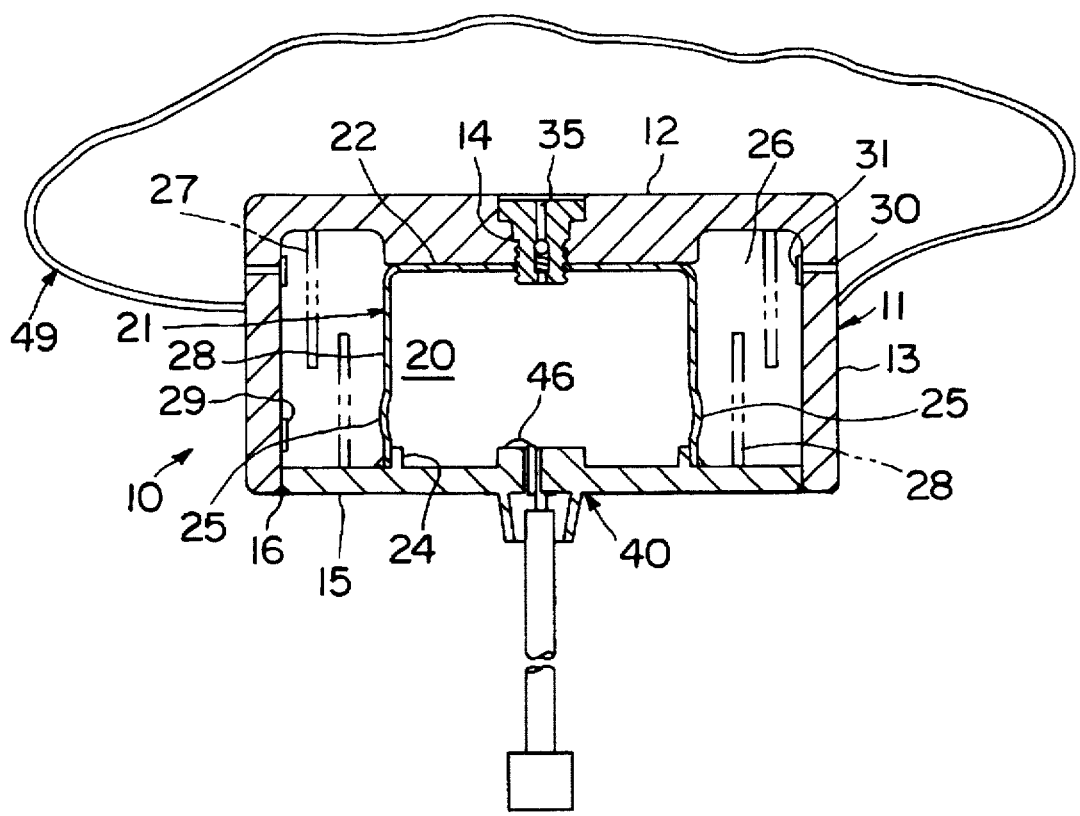
FIG. 1 is an axial cross-section of the presently-preferred embodiment of the invention.

The presently-preferred embodiment of the invention is shown in FIG. 1. An inflator 10 includes a cup-shaped body 11 with a base 12 and an encircling wall 13. A fill port 14 is formed through the base.

An end cap 15 is fitted to the open end of wall 13. A weld 16 structurally joins the body and the end cap, and hermetically seals the interior of the body.

A reaction chamber 20 is formed as a capsular enclosure by a cup-like body 21 having a base 22 which abuts base 12. This base is preferably bonded to it by adhesives or by a weldment (not shown). Body 21 includes a peripheral wall 23 whose open end is welded to the end cap and abuts a circular flange 24 on the end cap. Thus the end cap and the peripheral wall form reaction chamber 20, and make a structural and hermetic seal for it. The fill port extends through base 22 into chamber 20.

Body 21 is made of a suitable metal, with several areas 25 of reduced thickness to provide frangible burst portions that fracture to open when the charge is ignited. Fracture is caused by the pressure of the generated gases. These areas may further be reduced by engraved patterns, which eliminate the incidence of detached metal fragments in the gas stream.

The spacing between walls 13 and 23 forms an expansion chamber 26 in which any incompletely combusted gases may complete their reaction and expand to be cooled as appropriate. Optional annular baffles 27,28 may extend from the base and the end cap to provide a serpentine path, and to regulate, if necessary, the rate of reaction in the reaction chamber by causing a back pressure in the system.

If desired, patches 29 of a catalytic substance may be applied to the inside of wall 13 to catalyze the reaction of any unreacted components.

Nozzle ports 30 are formed through wall 18 of body 11. They will be closed by a layer of burst foil 31 which will be blown out by the exiting gases.

To fill the reaction chamber with a gas-generating charge, a fill valve 35 is threaded into the fill port. The fill valve is preferably welded to the base to form a permanent and gas tight seal. The fill valve will be of any desired type that enables the reaction chamber to be filled with a liquid charge. After the charging is completed, the fill valve will be permanently closed such as by welding it closed, or by sealing it with an epoxy or metal sealant.

An igniter 40 (FIG. 3) is fitted in an igniter port 41 in the end cap. A connector 42 is provided to connect the igniter with a source of current to initiate the reaction. In the preferred embodiment, a header 43 is fitted and structurally and hermetically fitted to the end cap. It passes leads 44 and 45 to a bridge wire 46, which may merely be a hot wire, or instead may be an exploding bridge wire. Such header and wire constructions are well-known.

Instead of relying on heat or explosiveness of a wire, a thin film may be connected between the leads which carries or consists of a conductive pyrotechnic which will heat and burn to ignite the charge.

Also, instead of leads and an electrical current, a window transparent to laser light may be placed in the header, and a laser source connected to it. Then laser light can ignite the charge through the window. Ignition may either be by direct absorption of the laser light or by laser heating of a pyrotechnic in a film to autoignite the liquid propellant.

It will be observed that the frangible areas in the reaction chamber wall are relatively close to the igniter, for a reason which will later be explained.

A flexible air bag 49 is schematically shown that is connected to the inflator to receive gases from the inflator, thereby to be inflated.

Figure 2:
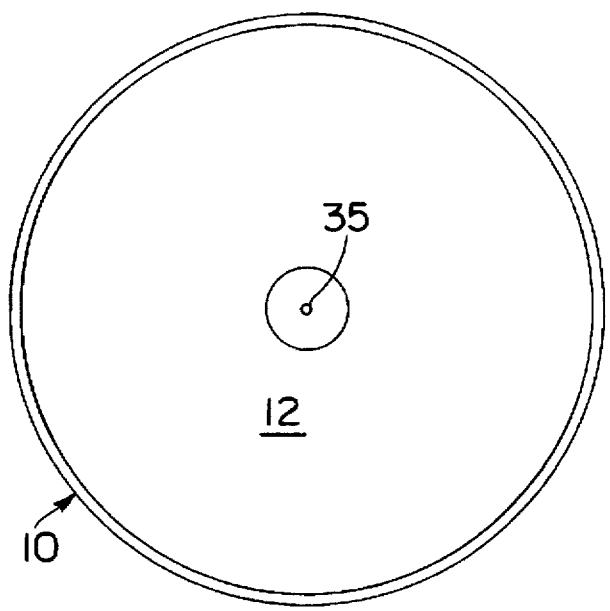
FIG. 2 is a top view taken in FIG. 1.
Figure 3:
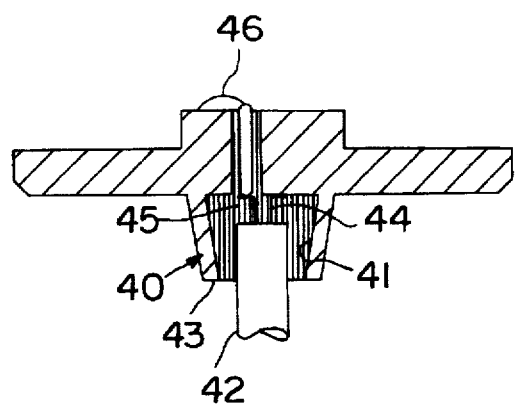
FIG. 3 is an enlarged portion of FIG. 1.
Figure 5:
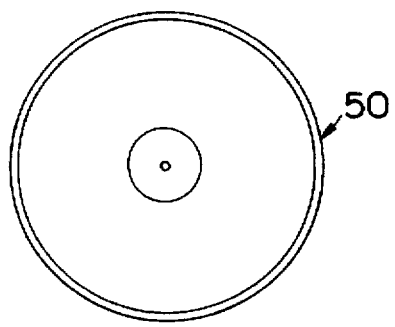
FIG. 5 is a bottom view taken in FIG. 4.

The embodiment of FIGS. 1-3 is most suitable for a driver side inflator, because it is rather squat and can fit into a compartment in the steering wheel. However, for a passenger side installation the height limitation is not as severe and a thinner and longer construction may be made which is more convenient in these locations and which has some advantages of its own. Because most of their parts differ only in relative dimensions, the description of the device in FIG. 4 will be brief.

An inflator 50 includes a cup like body 51 and end cap 52 which are joined and respectively include a fill valve 53 and igniter header 54. A tubular body 55 forms a reaction chamber 56, into which both the fill tube and header open.

Nozzle ports 57 are formed through body 51, closed by a burst foil 58. Frangible portions 59 are formed in the wall of body 55. A flexible air bag 59a is shown connected to the inflator.

Figure 4:
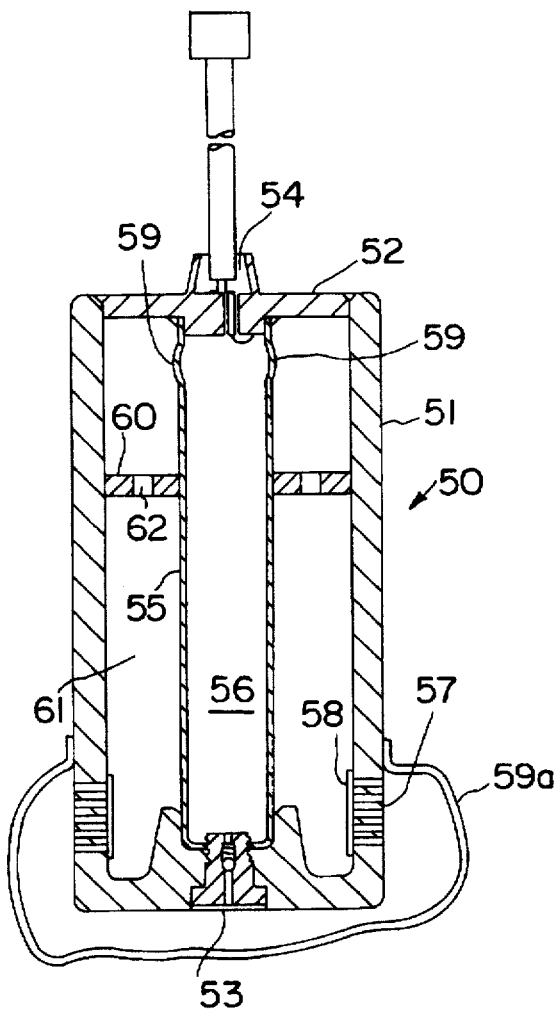
FIG. 4 is an axial cross-section of another embodiment of the invention.

The principal difference between the embodiments of FIGS. 1 and 4 is a ring-shaped baffle plate 60 extending across expansion chamber 61 with baffle ports 62 therethrough. Notice again that the frangible areas are close to the header. The header carries igniter means as already described.

Before discussing the gas-generating charge in detail, an observation will illustrate the superiority of this liquid charge over a solid charge. Notice that in this invention there is no separate initiator charge. All ignition occurs primarily in the reaction chamber and without participation by any other substance, such as hot gases from an initiator charge. The charge is complete, and when initiated its reaction is self-sustaining. Further, because there is a substantial length of charge from the initiator, and the frangible ports are close to the initiator, the reaction face of the charge will recede from the igniter and from the ports. Its gaseous products will exit through those ports and little or no liquid is exposed to require reaction in the expansion chamber (or in the air bag). No means is needed to expel the liquid charge, because the reaction chamber is closed beyond these ports. Accordingly, in contrast to other known devices that use liquid charges, it is intended that reaction primarily occurs in the chamber where the charge is stored. This significantly reduces the bulk and complexity of the device, because it is not necessary to provide a substantial volume in which reaction occurs, for reaction beyond the storage means (which in this invention also functions as the reaction chamber).

While nitrous oxide is significantly soluble in ethyl alcohol, for example, a greater molar proportion between this gas and the liquid alcohol is much to be preferred than results from solubility at standard temperatures and pressures. This can readily be accomplished by increasing the pressure under which the combination of these two components is stored. Of course under pressure there is to be expected some supernatant gas, but the major proportion of the nitrous oxide will be dissolved in the alcohol. This is a considerable advantage to this invention, because the reactants will be so fully mixed prior to reaction.

In addition, because the liquid component will always be in the liquid phase at the temperatures and pressures anticipated to be encountered, and because the critical temperatures and pressures of nitrous oxide are such that at some of the temperatures and pressures to be encountered, nitrous oxide in excess of that which can dissolve may be in the gas phase, it is to be understood that in defining these components, their liquid and gaseous condition are related to standard temperature and pressure.

The liquid component is selected to be environmentally acceptable, nontoxic to humans, and stable. This component should not include any element or radical which after reaction with nitrous oxide will produce any harmful product. Accordingly, a saturated alkane compound which is liquid at standard temperature and pressures is to be preferred. Straight chain alkane alcohols with carbon between 1 and 4 are useful, with ethyl alcohol the preferred substance because it is a "green" substance. It is non-toxic (can be denatured), and with N2O produces only oxides of carbon and nitrogen, and water. Other suitable alcohols in this series are methyl-, propyl-, and butyl-alcohols.

Alcohol selected from the group consisting of methyl alcohol, ethyl alcohol, and their combination, is also useful.

The gaseous component is nitrous oxide.

The molar relationship will be selected with the time to first gas (TTFG) and Rise Time and peak pressure in mind.

While the molar proportions of liquid to gas can vary from between about 10:90 to about 90:10, and some water can be included, the preferred charge is about 20% liquid to about 80% N2O by weight. Water can be added to provide the proper ignition point, pressure rise time, and volume of gas to be produced, and the ratio of the two reactants can be varied along with it. Water will rarely be added in an amount greater than about 40% of the total charge. Also the various burst diaphragms, port configurations and sizes will alter the rise time and initial pressure time parameters.

The preferred charge will be stored at about 750 psig.

This invention is not to be limited by the embodiments shown in the drawings and described in the description, which are given by way of example and not of limitation, but only in accordance with the scope of the appended claims.

We claim:

1. A gas generator to provide gases under pressure for inflating a vehicular air bag comprising:
   a capsular enclosure forming a reaction chamber, said enclosure having a wall with a frangible portion therein which fractures upon the exertion of a sufficient gas pressure in said reaction chamber;
   an electrically conductive, heat-generating initiator inside reaction chamber;
   fill means through said wall to enable the injection of a liquid charge into said reaction chamber and to retain it therein; and
   a liquid gas-generating charge which is autoignitable by said initiator, and whose reaction is self-sustaining after ignition;
   said frangible portion being disposed between said initiator and a major proportion of said charge, whereby upon ignition said charge generates a gas pressure to open said portion, and the face of the reaction progresses into the chamber on the opposite side of said portion from said initiator.

2. A gas generator according to claim 1 in which said gas-generating charge comprises:
   a liquid component which is a saturated alkane alcohol having 1, 2, 3, or 4 carbon atoms, which is in its liquid phase when at standard temperature and pressure, and at conditions to be anticipated in a passenger vehicle, and a gaseous component comprising nitrous oxide, said charge being stored in said reaction chamber at superatmospheric pressure such as to increase the solubility of the gaseous component in the liquid component, and render the charge primarily a liquid.

3. A gas generator according to claim 2 in which water is added in an amount suitable to a selected rate of reaction of the alcohol and the nitrous oxide.

4. A gas generator according to claim 2 in which said alcohol is selected from the group consisting of methyl alcohol, ethyl alcohol, and their combination.

5. A gas generator according to claim 4 in which the molar ratio of alcohol to nitrous oxide is between about 10:90 and about 90:10.

6. A gas generator charge according to claim 4 in which the alcohol is ethyl alcohol and the molar ratio of the alcohol to the nitrous oxide is about 20:80.

7. In combination:
   an inflatable bag; and
   a gas generator according to claim 1, said frangible portions communicated to said bag to inflate said bag when the gas generating charge is initiated to generate gas; and whose constituents and products of combustion are non-toxic and biodegradable.

8. A gas generator according to claim 1 in which said capsular enclosure is surrounded by an outer wall which forms an expansion chamber between them, said frangible portions, when open, opening into said expansion chamber, said expansion chambers having outlet ports through said outer wall which discharge gas to inflate said air bag.

9. A gas generator according to claim 8 in which said initiator is a wire adapted to be heated or exploded to ignite the charge.

10. A gas generator according to claim 8 in which said initiator is a strip of chemical composition adapted to generate hot gases sufficient to ignite the charge when initiated.

11. A gas generator according to claim 8 in which said generator includes a transparent portion at the igniter means location to transmit laser light energy to ignite the charge.

12. A gas generator according to claim 8 in which baffle means is placed in said expansion chamber to regulate the flow of generated gases from the generator.

13. A gas generator according to claim 12 in which said outer wall and capsular enclosure are concentrically coaxial, and extend for a substantial distance from said frangible portions.

14. A gas generator according to claim 13 in which said baffle means is a disc extending across said expansion chamber having openings therethrough.

15. A gas generator according to claim 1 in which said means includes a valve adapted be sealed closed after the charge is injected into the reaction chamber.

* * * * *